Patented Nov. 25, 1924.

1,517,002

UNITED STATES PATENT OFFICE.

HANS HAHL AND HERMANN WEYLAND, OF ELBERFELD, GERMANY, ASSIGNORS TO FARBENFABRIKEN VORM. FRIEDR. BAYER AND CO., OF LEVERKUSEN, NEAR COLOGNE-ON-THE-RHINE, GERMANY.

PHARMACEUTICAL COMPOUND CONTAINING THE SODIUM-SILVER COMPOUND OF THIODIGLYCOLIC ACID.

No Drawing.   Application filed June 22, 1923. Serial No. 647,171.

*To all whom it may concern:*

Be it known that we, HANS HAHL and HERMANN WEYLAND, citizens of Germany, residing at Elberfeld, in the State of Prussia, Germany, have invented new and useful Improvements in a Pharmaceutical Compound Containing the Sodium-Silver Compound of Thiodiglycolic Acid, of which the following is a specification.

We have found that a new and valuable silver compound is obtained by treating the thiodiglycolic acid

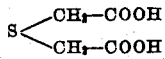

with a silver compound and then neutralizing. It is a valuable remedy against gonorrhea and is of neutral reaction and free from any irritating action. It is a whitish powder easily soluble in water. Its aqueous solutions do not decompose.

In order to illustrate our new process more fully the following example is given, the parts being by weight:

300 parts of thiodiglycolic acid are dissolved in 700 parts of water and treated with 69 parts of carbonate of silver. The mixture is neutralized with carbonate of sodium, the solution heated on the water bath for one hour, filtered and poured into a 95 per cent alcohol. The precipitate is filtered off, washed with alcohol and dried at a low temperature in the dark.

We claim:—

The herein described new silver compound of thiodiglycolic acid, said compound containing sodium and being a whitish powder easily soluble in water with a neutral reaction and being a valuable remedy against gonorrhea, substantially as described.

In testimony whereof we have hereunto set our hands.

HANS HAHL.
HERMANN WEYLAND.